United States Patent [19]

Boda

[11] Patent Number: 5,322,001
[45] Date of Patent: Jun. 21, 1994

[54] PAPER CUTTER WITH CIRCULAR BLADES

[75] Inventor: James C. Boda, Winneconne, Wis.

[73] Assignee: Fiskars Oy Ab, Helsinki, Finland

[21] Appl. No.: 68,399

[22] Filed: May 28, 1993

[51] Int. Cl.$^5$ ............................................. B26D 1/18
[52] U.S. Cl. ..................................... 83/485; 83/455; 83/564; 83/588; 83/614
[58] Field of Search .............. 83/455, 485, 486.1, 83/564, 582, 588, 614, 481

[56] References Cited

U.S. PATENT DOCUMENTS

| | | |
|---|---|---|
| 1,075,050 | 10/1913 | Mihills. |
| 2,327,223 | 8/1943 | Silver. |
| 2,753,938 | 7/1956 | Thiess. |
| 3,139,124 | 6/1964 | Hoff .......................... 83/486.1 X |
| 3,227,016 | 1/1966 | Moeller. |
| 3,237,497 | 3/1966 | Cook .......................... 83/455 X |
| 3,301,117 | 1/1967 | Spaulding .................. 83/614 X |
| 3,779,119 | 12/1973 | Broides. |
| 3,821,915 | 7/1974 | Larrable. |
| 4,516,452 | 5/1985 | Dahle ........................... 83/455 |
| 4,662,258 | 5/1987 | Mood ........................... 83/455 |
| 4,686,876 | 8/1987 | Hume et al.. |
| 5,069,097 | 12/1991 | Mori ........................... 83/455 X |

*Primary Examiner*—Eugenia Jones
*Attorney, Agent, or Firm*—Foley & Lardner

[57] ABSTRACT

A cutting board assembly for cutting and/or trimming paper sheets, the assembly including a cutting board, a rail assembly pivotally mounted on said cutting board for movement between operative and inoperative positions, a carriage assembly mounted on the rail assembly for movement across the cutting board, a circular cutting blade mounted in the carriage assembly which is biased to an inoperative position on the rail assembly, a self-healing pad mounted on the cutting board in the path of travel of the cutting blade whereby the carriage assembly is pushed downward on the rail assembly to move the cutting blade to an operative position with respect to the self-healing pad for trimming or cutting the paper sheets.

10 Claims, 5 Drawing Sheets

PAPER CUTTER WITH CIRCULAR BLADES

FIELD OF THE INVENTION

This invention relates to paper cutting devices and more particularly to a cutting board having a cutting blade carriage assembly mounted for translational movement on a rail assembly mounted on the cutting board to facilitate the cutting and trimming of sheet material.

BACKGROUND OF THE INVENTION

Cutting boards of the type contemplated here are shown in U.S. Pat. No. 2,327,223, entitled "Sheet Trimmer," issued to C. Silver, on Aug. 17, 1943, U.S. Pat. No. 2,753,938, entitled "Dispenser and Cutter For Rolled Paper and The Like," issued to E. R. Thiess on Jul. 10, 1956, and U.S. Pat. No. 3,821,915, entitled "Fiber Cutting Apparatus With Self-Contained Blade Sharpener," issued to W. T. Larrable on Jul. 2, 1974. In each of these patents a cutter blade, either rotary or stationery, is mounted in a housing that is pushed or driven across the cutting board to cut various materials. In each of these patents a slot is provided in the cutting board to accommodate the cutting blade. The patents to Thiess '938 and Larrable '915 are concerned with cutting strips of rolled material. Silver '223 is concerned with a sheet trimmer which has a stationary knife mounted on the edge of the cutting board that is engaged by a knife rotated by a pinion gear as it is pushed past a set of gear teeth formed on a guide shaft.

SUMMARY OF THE PRESENT INVENTION

The present invention is concerned with a carriage assembly which is mounted on a rail assembly for translational movement across a cutting board to cut or trim various materials. The rail assembly is mounted for pivotal motion with respect to the cutting board to raise the carriage assembly above the board. A circular blade is mounted in the carriage assembly for rotary motion. A self-healing pad is provided on the cutting board, beneath the rail assembly, in alignment with the path of motion of the carriage head assembly to rotate the blade as the carriage assembly is moved relative to the cutting board. The circular blade is biased to an inoperative position in the carriage assembly when not in use. The carriage assembly is pushed down to move the blade into engagement with the self-healing pad and then moved across the rail to cut or trim the paper.

One of the primary features of the invention is the withdrawal of the cutting blade to a storage position in the carriage assembly.

Another feature of the invention is the ability to interchange cutting blades quickly and easily to provide a pinking, a perforated, a wave or a straight edge on the paper. This change is made by merely removing the cover from the carriage assembly and removing the blade from a pivot pin on the cover and substituting a pinking, a wave or a perforated blade. The blade is automatically aligned in the carriage head on replacement of the cover.

The cutting board assembly for cutting and/or trimming sheets of paper generally includes a cutting board for supporting the various materials and a rail assembly pivotally mounted on the cutting board for supporting a cutting blade carriage assembly. The carriage assembly generally includes a trolley mounted on the rail assembly and a cover removably mounted on the trolley for supporting the cutting blade. The trolley includes a spring assembly for biasing the carriage assembly to a storage position on the rail assembly. The cutting blade is actuated by pushing the carriage assembly down to move the cutting blade into engagement with a self healing pad mounted on the cutting board and then pushed across the board to cut or trim the paper sheets.

Other principal features and advantages of the invention will become apparent to those skilled in the art upon review of the following drawings, the detailed description and the appended claims.

BRIEF DESCRIPTION OF THE DRAWINGS

FIG. 2 is a front elevation view of the cutting board showing the carriage assembly mounted on the rail assembly;

FIG. 8 is a cross section view of the carriage assembly taken on line 8—8 of FIG. 2 of the front of the trolley;

FIG. 9 is a cross section view similar to FIG. 8 showing a pinking blade in the carriage assembly;

FIG. 10 is a view similar to FIG. 8 shown in the cutting position;

Figure 1:
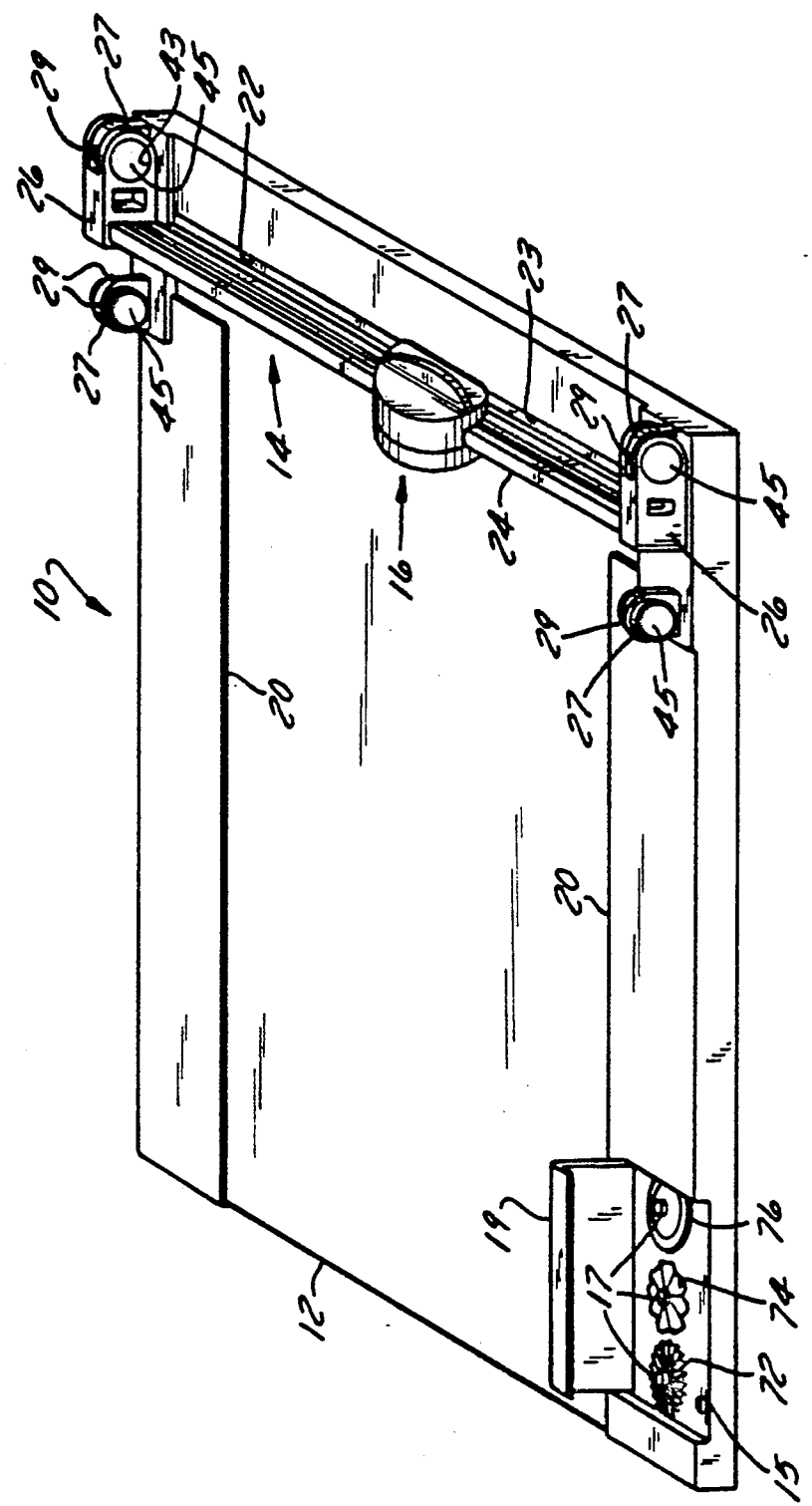
FIG. 1 is a perspective view of the cutting board showing the carriage assembly mounted on the rail assembly.

Before explaining at least one embodiment of the invention in detail it is to be understood that the invention is not limited in its application to the details of construction and the arrangement of the components set forth in the following description or illustrated in the drawings. The invention is capable of other embodiments or being practiced or carried out in various ways. Also, it is to be understood that the phraseology and terminology employed herein is for the purpose of description and should not be regarded as limiting.

DETAILED DESCRIPTION OF THE PREFERRED EMBODIMENTS

Figures 2, 8, 9, 10:
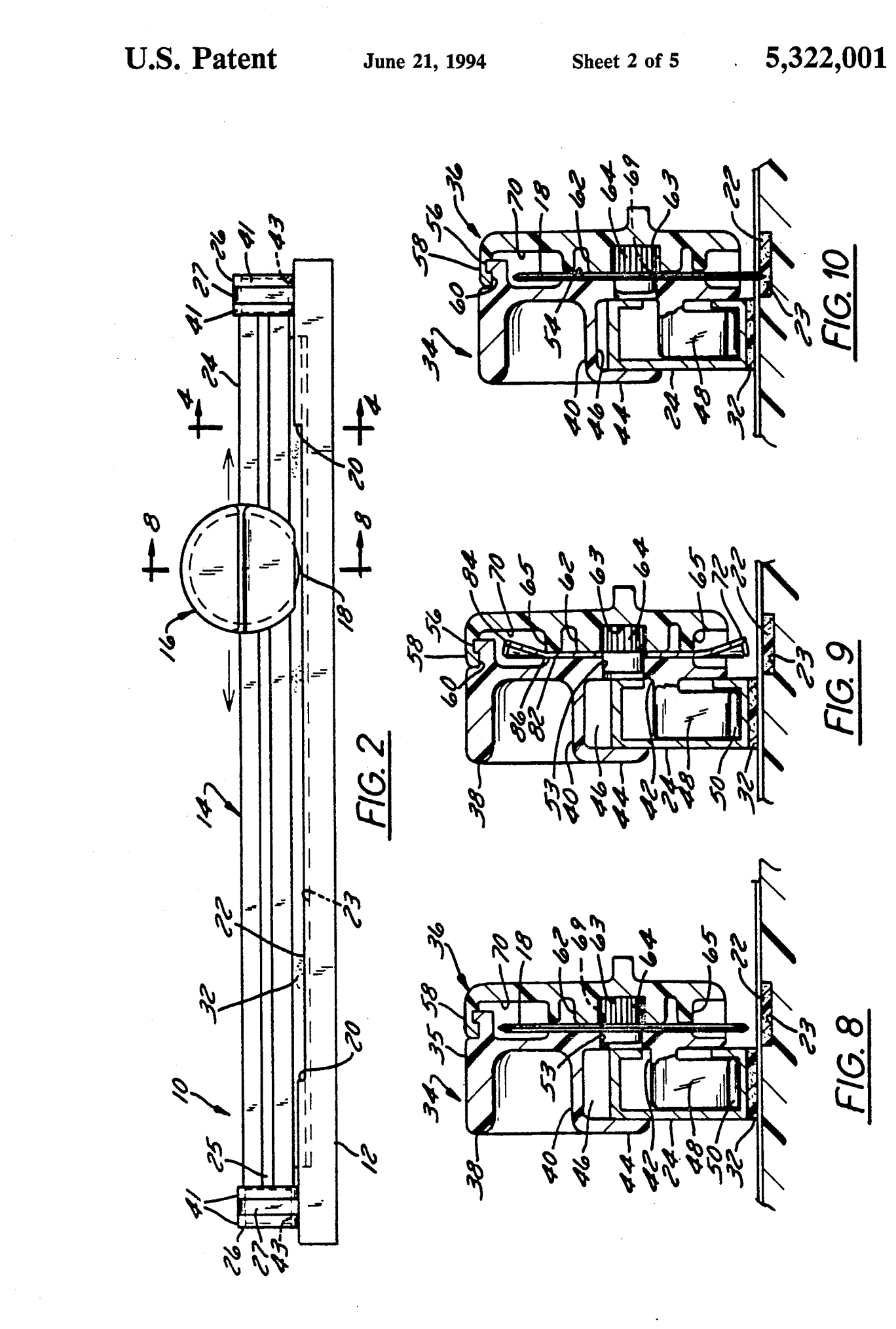

The paper cutter 10 according to the present invention as shown in FIGS. 1 and 2 generally includes a cutting board 12, a rail assembly 14 pivotally mounted on one end of the cutting board and a carriage assembly 16 mounted on the rail assembly 14 for movement across the cutting board. The carriage assembly 16 includes a circular cutting blade 18 for cutting or trimming various materials aligned with the rail assembly 16. Although a flat circular cutting blade is described herein, circular pinking, perforating or wave blades can be used to provide different shaped edges on the paper sheets as described herein.

The cutting board 12 includes a paper guide 20 on each side of the cutting board for aligning paper stock under the carriage assembly 16. A self-healing pad 22 is mounted in a groove 23 in the cutting board 12 beneath the carriage assembly 16. A recess 15 is provided in the cutting board 12 for storing the various cutting blades on pins 17. A cover 19 is pivotally mounted on the board to enclose the recess.

Figure 3:
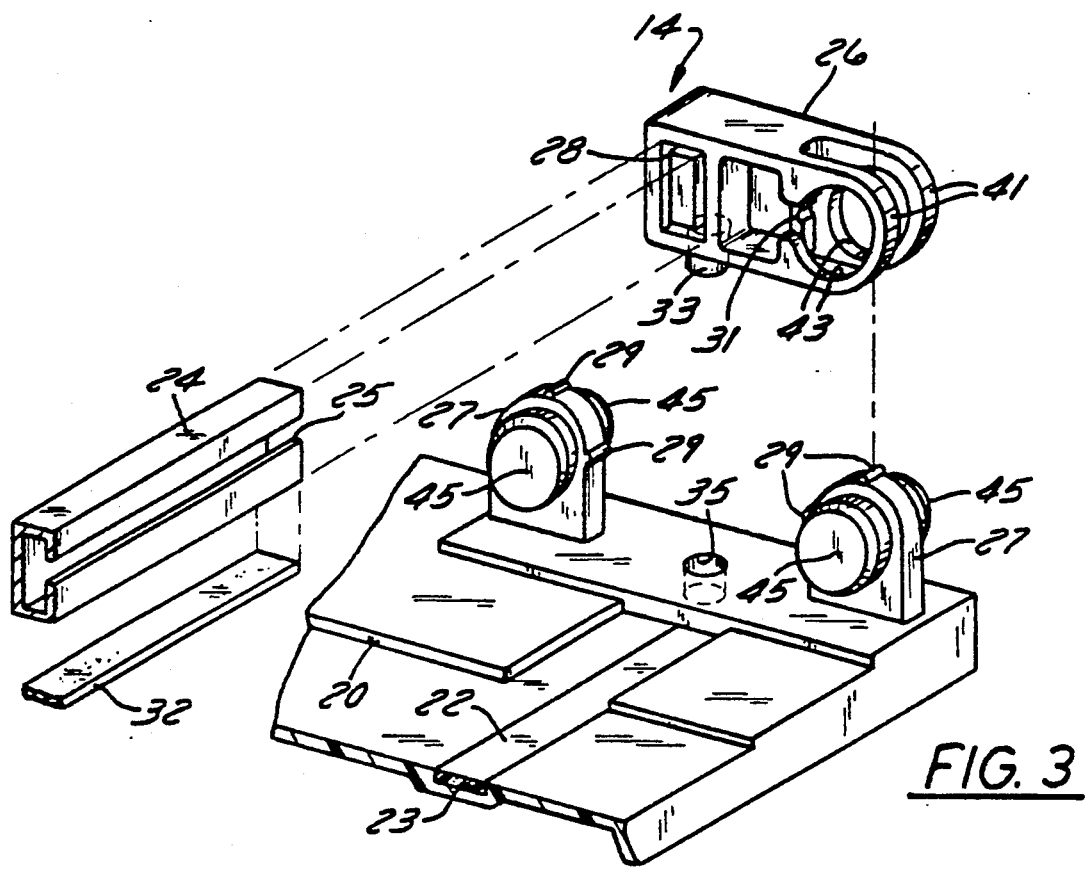
FIG. 3 is an exploded perspective view of one end of the rail assembly.
Figure 4:
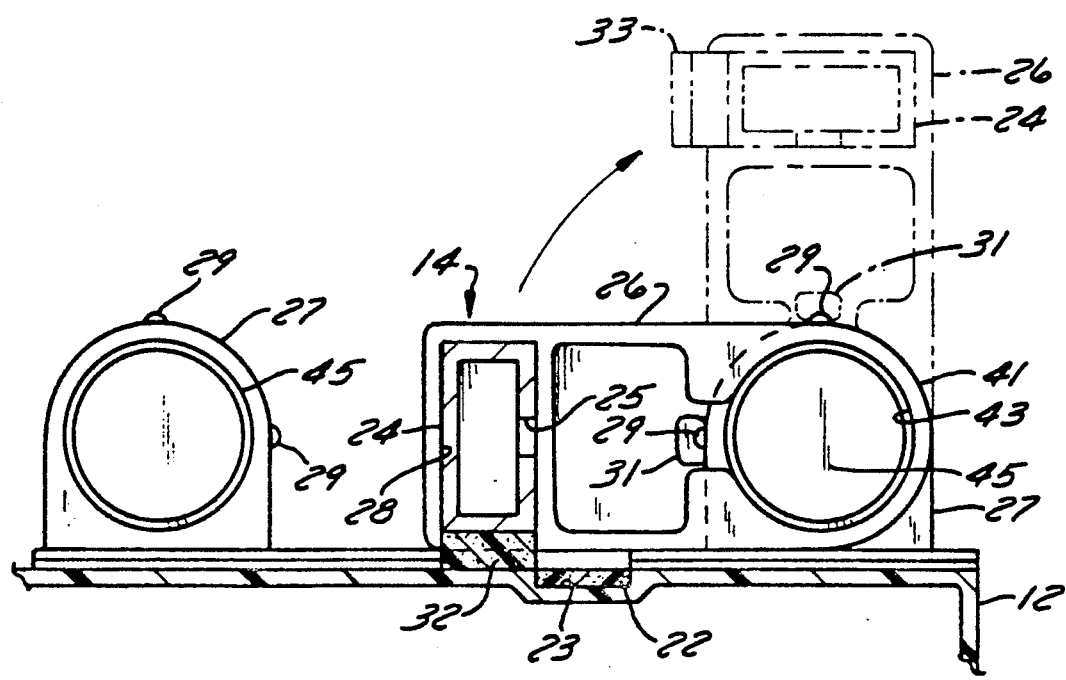
FIG. 4 is a cross section view taken on line 4—4 of FIG. 2.
Figure 5:
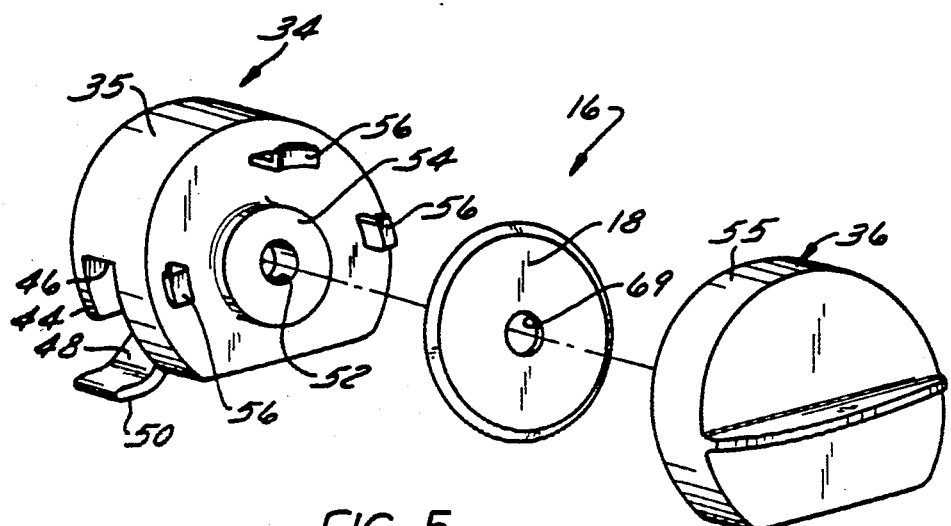
FIG. 5 is an exploded perspective view of the carriage assembly.
Figure 6:
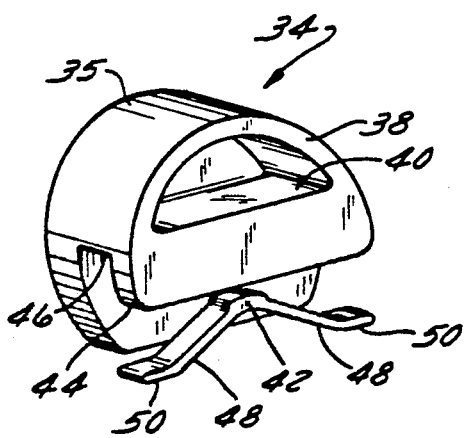
FIG. 6 is a perspective view of the trolley.
Figure 7:
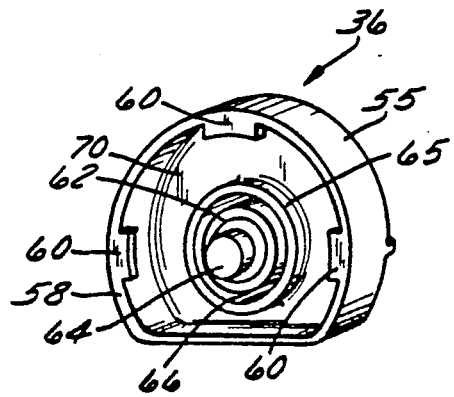
FIG. 7 is a perspective view of the back of the cover.

The rail assembly 14 as shown in FIGS. 3 and 4 includes a rectangular rail 24 having an opening 25 on one side. The rail is supported at each end by pivot posts 26 which are pivotally mounted on pivot blocks 27. The ends of the rail 24 are seated in rectangular grooves 28 at the upper end of each of the pivot posts 26. A foam pad 32 is mounted on the bottom of the rail 24 to engage and hold the paper in position on the cutting board when moved to the cutting position. A guide 33 is provided on the side of each pivot post 26 which is aligned with a recess 35 in the cutting board to stabilize the rail assembly above the paper.

The pivot posts 26 are pivotally mounted on pivot blocks 27 mounted on each side of the cutting board 12. In this regard, each post 26 has a pair of legs 41. Each leg 41 includes openings 43 which matingly engage protrusions 45 provided on each side of the pivot blocks 27. A limit stop 29 is provided on the top and side of each pivot block 27 to engage a latch 31 in the pivot post 26 to hold the rail assembly in the open or operative position.

The carriage assembly 16 as shown in FIGS. 5, 6, 7 and 8 includes a trolley 34 and a cover 36. The trolley 34 is in the form of a molded plastic piece having a semi-circular body 35. A flange 38 is provided around the upper edge of the body 35 which terminates at a ledge 40. A flange 44 depends from the ledge 40 downward to form a space 46 to accommodate the upper portion of rail 24. A pair of leaf springs 48 are molded on a support member 42 below the flange 44 which extend outwardly and downwardly therefrom. The ends 50 of the springs 48 are in the form of pads which slide across the inside of the rail 24 as described hereinafter. The front side of the body 35 includes a hole 52 centrally located on the face of the body 35 and surrounded by a circular support surface 54. A set of three L-shaped flanges 56 are molded on the perimeter of the front of the body 35.

The cover 36 is in the form of a semi-circular housing 55 having a flange 58 around the outer perimeter. A number of tabs 60 corresponding to the number of flanges 56 on the trolley are located around the edge of the flange 58. A hub 62 having a blind bore 63 is provided in the center of the housing 55. A steel pin 64 is positioned in the bore 63. A circular ridge 65 is formed around the hub 62 which forms a recess 70 between the ridge 65 and the ridge 58. On assembly the cover 36 is rotated far enough for the tabs 60 to clear the flanges 56. The pin 64 is aligned with the hole 52 in the trolley 34 and the cover rotated to interlock the tabs 60 with the flanges 56.

The rotary cutting blade 18 includes a center opening 69 and is mounted on the pin 64 in abutting engagement with support surface 54 when the cover 36 is mounted on the trolley 34. It should be noted that the recess 70 provided around the periphery of the ridge 65 accommodates cutting blades having cutting edges offset from the center of the blade. In this regard a pinking blade 72, a wave blade 74 or a perforating blade 76 can be stored on the pins 17 in recess 15. A pinking blade 72 is shown in FIG. 9 mounted on pin 64. The pinking blade 72 has a center section 82 and a cutting edge 84 offset from the center section 86 into the space 70 provided in cover 36.

The trolley 34 is mounted on the rail 24 by sliding the leaf springs 48 into the inside of the rail with the flange 44 aligned with the outside of the rail 24. One of the cutting blades is mounted on pin 64 and the cover 36 mounted on the trolley 34. In operation the paper sheets are aligned with one edge of the groove 23 and moved under the rail assembly 14. The rail assembly 14 is pivoted to the operative position with the foam pad 32 resting on the edge of the paper. The carriage assembly is pushed down as shown in FIG. 10 far enough for the blade 18 to engage the self-healing mat 22. The carriage assembly is then pushed across the rail assembly. The blade will roll across the mat cutting or trimming the edge of the paper sheet. When released the springs 48 will bias the carriage assembly upward to clear the blade from the paper.

Figure 11:
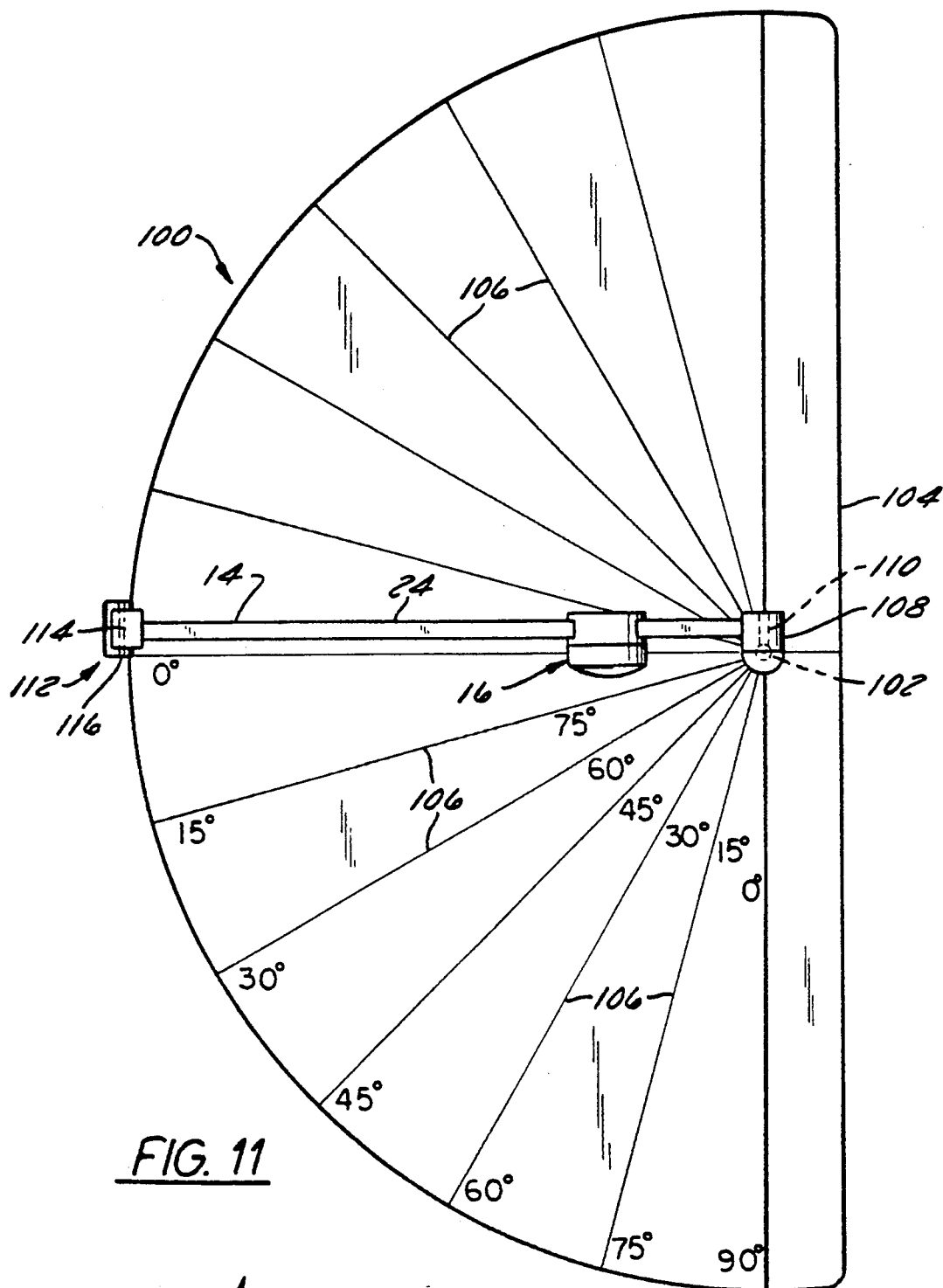
FIG. 11 is a top view of the paper cutter mounted on a craft cutter board.
Figure 12:
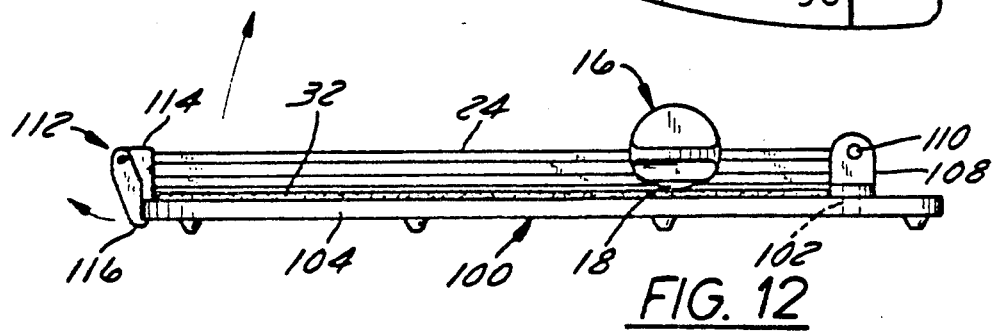
FIG. 12 is an elevation view of the craft cutter board.

The paper cutter as described herein can also be used in combination with a craft cutter board 100 as shown in FIGS. 11 and 12. The craft board is in the form of a semi-circle having a pivot point 102 at the mid point of the straight edge 104. Radial lines 106 are drawn outwardly from the pivot point 102 at 15 degree intervals. The rail assembly 14 has been modified by removing the pivot posts 26 and mounting a center post 108 on one end of the rail 24 and a clamp assembly 112 at the other end of the rail 24. The center post 108 is free to pivot about pivot point 102 and the rail 24 is free to pivot about pivot pin 110 at the top of center post 108. The clamp assembly 112 includes an end cap 114 mounted on rail 24 and an over center latch 116 which is free to pivot about end cap 114 into engagement with the edge of board 100. Paper aligned with the 0° radial line 106 will be secured to the board by the pad 32 when the rail assembly is latched to the board. The carriage assembly can then be pushed down and moved across the rail assembly to cut the paper.

Thus, it should be apparent that there has been provided in accordance with the present invention a paper cutter with circular blades that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

1. A cutting board assembly for cutting or trimming paper sheets, said assembly comprising a cutting board, a pair of posts mounted on said cutting board, a rail assembly pivotally mounted on said posts in a parallel relation to said cutting board, a carriage assembly mounted on said rail assembly for movement across the cutting board, a circular cutting blade mounted for rotary motion in said carriage assembly, means for biasing said carriage assembly to an inoperative position on said rail assembly, said biasing means comprises a pair of leaf springs mounted on said carriage assembly for biasing said carriage assembly to an inoperative position on said rail assembly whereby said carriage assembly must be moved from said inoperative position to an operative position on the rail assembly for cutting or trimming the paper sheets.

2. The cutting board assembly according to claim 1 including a self-healing pad mounted on said board in the path of said blade.

3. The cutting board assembly according to claim 1 wherein said rail assembly includes a rectangular rail and said carriage assembly includes a trolley mounted on said rail and a cover mounted on said trolley for supporting the cutting blade on the trolley.

4. The cutting board assembly according to claim 3 including a self-healing pad embedded in said cutting board.

5. The cutting board assembly according to claim 1 wherein said carriage assembly includes a trolley mounted for sliding movement on said assembly and a cover removably mounted on said trolley, said circular cutting blade being removably mounted on said cover whereby cutting blades having different cutting edges may be mounted on said cover.

6. A paper cutting or trimming device comprising:
a cutting board having a material guide in the board,
a rail assembly mounted in a parallel relation to said cutting board for pivotal movement between operative and inoperative positions with respect to said cutting board,
a carriage assembly mounted for sliding movement on said rail assembly,
said carriage assembly including a circular blade for cutting or trimming paper sheets,
a pair of spring blades formed on said carriage assembly for supporting and biasing said carriage assembly to an inoperative position on said rail assembly, and
a mat embedded in the surface of said cutting board in alignment with the circular cutting blade whereby said cutting blade will roll across the mat on the cutting board when moved to the operative position on said rail assembly to cut or trim the edge of the paper.

7. The cutting board according to claim 6 wherein said rail assembly includes a hollow rectangular rail having a longitudinal opening along one side and said carriage assembly includes a trolley mounted for longitudinal travel on said rail.

8. Apparatus for cutting sheet material comprising:
a cutter board, a pair of pivot blocks mounted in a spaced relation on said cutter board,
a rail assembly pivotally mounted on said pivot blocks for movement between operative and inoperative positions with respect to said board,
a carriage assembly mounted on said rail assembly for translational movement across the board,
said carriage assembly including a rotary cutting blade, and
a spring assembly formed on said carriage assembly for biasing said carriage assembly to an inoperative position on said rail assembly whereby said cutting blade is activated by pressing said carriage assembly down and sliding said carriage assembly across said rail assembly.

9. The apparatus according to claim 8, wherein said rail assembly includes a pivot post on each end pivotally mounted on said pivot blocks whereby said rail assembly can be pivoted away from said cutter board to place paper on the board and toward the board to align the carriage assembly in a position to cut the paper.

10. The apparatus according to claim 8 wherein said rail assembly includes a rectangular rail and said carriage assembly includes a trolley mounted on said rail with said spring assembly positioned in said rail for biasing said trolley away from said board.

* * * * *